No. 820,981. PATENTED MAY 22, 1906.
J. C. MILLER.
PASTEURIZER.
APPLICATION FILED JULY 30, 1903.
2 SHEETS—SHEET 1.
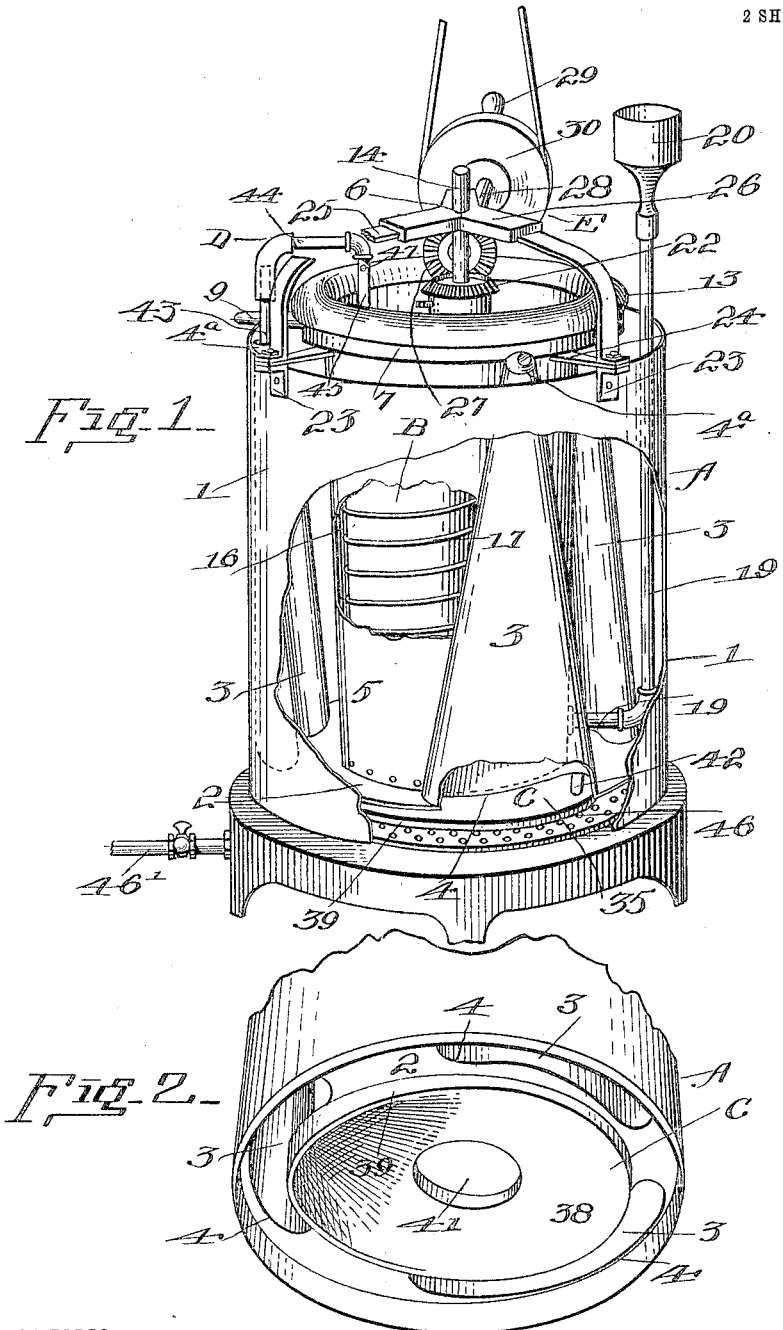
WITNESSES:
INVENTOR
John C. Miller
BY H. H. Bliss
ATTORNEY No. 820,981. PATENTED MAY 22, 1906.
J. C. MILLER.
PASTEURIZER.
APPLICATION FILED JULY 30, 1903.

2 SHEETS—SHEET 2.

WITNESSES:

INVENTOR
John C. Miller

BY
ATTORNEY

UNITED STATES PATENT OFFICE.

JOHN C. MILLER, OF CANTON, OHIO, ASSIGNOR TO THE MILLER PASTEURIZING MACHINE COMPANY, OF CANTON, OHIO, A CORPORATION OF OHIO.

PASTEURIZER.

No. 820,981.　　　　Specification of Letters Patent.　　　　Patented May 22, 1906.

Application filed July 30, 1903. Serial No. 167,594.

*To all whom it may concern:*

Be it known that I, JOHN C. MILLER, a citizen of the United States, residing at Canton, in the county of Stark and State of Ohio, have invented certain new and useful Improvements in Pasteurizers, of which the following is a specification, reference being had therein to the accompanying drawings.

This invention relates to improvements in machines for pasteurizing liquids.

It has for its object to provide a pasteurizer for use where small quantities of liquid are to be pasteurized. It is particularly adapted for pasteurizing milk which has to be transported a considerable distance before reaching the dairy or plant from which it is to be distributed.

Figure 3:
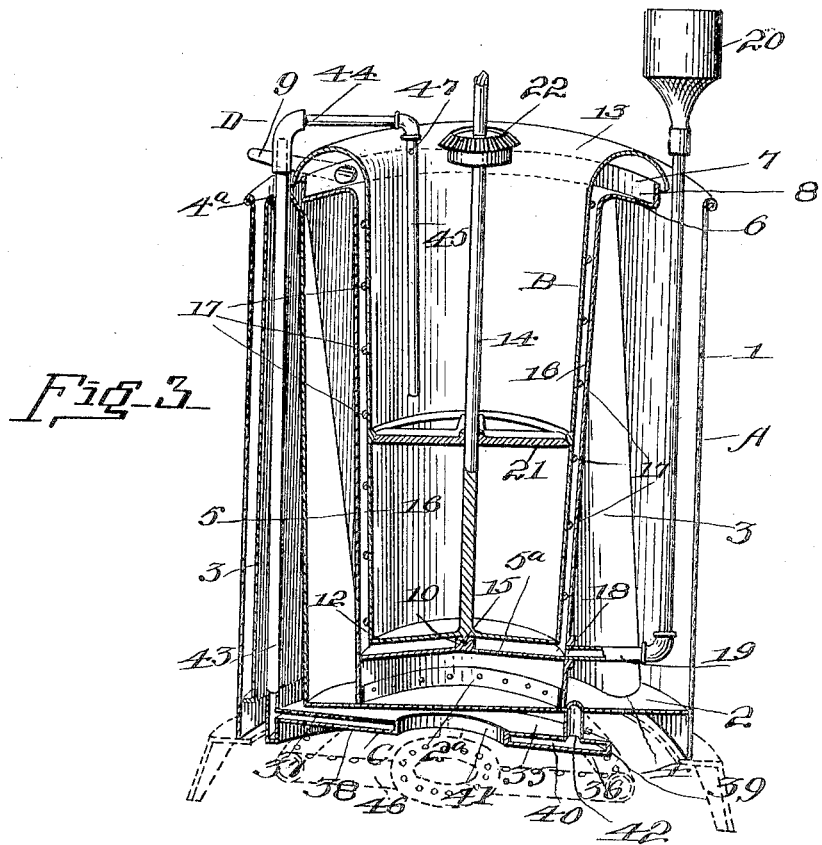
Figure 4:
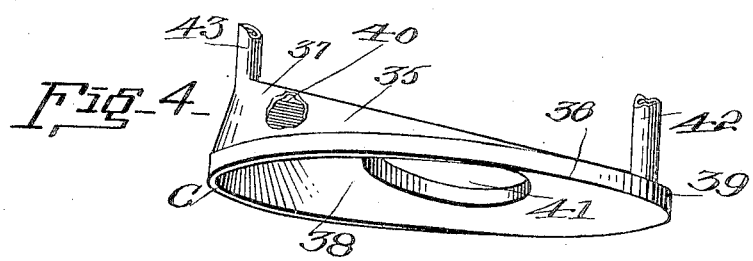

Figure 1 is a perspective, partly in section, of a machine embodying my improvements. Fig. 2 is a perspective view of the bottom of the sterilizer. Fig. 3 shows in perspective a vertical central section of a machine embodying my improvements. Fig. 4 is a perspective of the water-distributing chamber.

In the drawings, A represents the external cylinder, and B the internal concentric cylinder, both adapted to receive the heating medium.

C represents the water-distributing chamber or compartment as an entirety.

D represents the water-circulating duct as an entirety, and E the power-transmitting mechanism.

The outer cylinder has the vertical side walls 1 and a horizontal bottom wall 2.

3 represents tapering passage-ways or flues communicating at their bases with apertures 4 in the said bottom wall of the cylinder and having their apexes extending slightly above the upper edges of the side walls 1, as indicated at 4$^a$.

5 is a cylinder concentric with the last-named cylinder and adapted to be placed therein and to rest upon and be secured to the bottom wall 2 thereof, as by a flange 2$^a$. This cylinder 5 is provided with a bottom wall 5$^a$ and at its top has an outwardly-extending flange 6 with a rim 7, adapted to provide the annular trough or groove 8, the purpose of which will hereinafter be described.

9 is a duct or pipe communicating with this groove or trough 8.

Secured to the bottom wall 5$^a$ at its center is a stepped bearing 10, in which is fitted the end 15 of the shaft 14, which is rigidly secured to and revoluble with the innermost concentric cylinder B. This cylinder has the bottom wall 12 and the top flange or lip 13 adapted to overhang the trough 8 and to project slightly below the top of its rim, as shown. The annular space 16 between the cylinder 5 and the cylinder B, through which the liquid to be treated must pass, is of relatively small cross-sectional area, so that but a very thin stream of the liquid can pass between the cylinders.

18 is an aperture in the cylinder 5, situated just above the bottom wall 5$^a$. 19 is a pipe or duct communicating through this aperture with the passage-way 16. The liquid to be sterilized is poured into the funnel 20 and passes down through the pipe 19 and into the said space between the cylinders 5 and B.

17 indicates a wire of practically the same diameter as the width of the space between the cylinders 5 and B. It is wound helically about the inner cylinder B and rigidly secured thereto, so that when the cylinder B is inserted within the cylinder 5 this wire practically forms with the surfaces of the two cylinders a continuous helical passage-way for the liquid. This helical wire serves both to elevate the liquid between the cylinders and also to cause it to flow in a circuitous path in its upward travel, and thus greatly elongate its total path in a given vertical distance as the cylinder is rotated, and, further, serves to break up the filaments that tend to form under the action of the heat, and thus to retard and prevent coagulation.

The power for rotating the shaft 14 may be applied in any suitable manner.

23 23 indicate brackets secured to the wall 1 of the external cylinder. To these are secured the spacing-bars or braces 24 for the cylinder 5 and also the tripod 25, which carries the bearing-block 26, in which the upper end of the shaft 14 is rotatably mounted.

22 is a beveled pinion rigidly secured to the shaft 14 and meshing with the beveled driving-gear 27, secured to the power-shaft 28. This shaft is provided with a wheel 30, having a handle-crank 29, by means of which the shaft can be operated. When desired, this wheel can also be driven by a belt, as indicated.

A spider 21 may be used to brace the interior of the cylinder and to set the shaft 14 therein.

In machines of the continuous-flow type such as this one it is essential that the liquid to be sterilized, especially when it is milk, should be uniformly heated. Even in machines in which the passage-ways for the liquid to be heated or sterilized are as narrow as those in the present instance if there is a difference in the temperatures between the heating medium on one side and that on the other side of the stream of milk there will be a tendency for some of the constituents of the milk to coagulate and to be deposited on the hotter one of the surfaces bounding the passages. Where steam is used as the heating agent, many different methods have been devised for maintaining uniformity of temperature between the heating medium on the opposite sides of the liquid passage-way. The machine herein presented, however, is intended primarily for use where only small quantities of milk are to be pasteurized and where the use of steam would not be economical. This machine is adapted to be placed over a stove or burner of any well-known variety and to receive heat therefrom. In the present instance I have provided for maintaining equal temperature on both sides of the liquid to be sterilized by the use of a novel water heating and distributing device.

The heater and distributer C is constructed in a peculiar manner, the purpose being to provide a receptacle (or duct of expanded dimensions) wherein the water can be rapidly heated to a relatively high degree and through which it will readily and rapidly pass in an upward direction in order to accomplish purposes to be described. This device when made in the form illustrated has a top wall 35, which is curvilinear in vertical sections transverse to the path of the water, the wall at its central vertical plane sloping upward somewhat rapidly, the result being that it is approximately flat at the receiving side, as at 36, and quite sharply curved downward on transverse lines near the discharge end, as at 37. The bottom wall 38 is correspondingly shaped and arranged parallel to the top wall 35. The walls are joined together preferably by an annular peripheral rim or vertical wall 39 of substantially the same width throughout. A peculiarly-shaped chamber 40 is thus formed by the walls 35, 38, and 39. It receives water through a supply-duct 42 at its lower end, which communicates with the interior of the cylinder A. At its upper end the chamber 40 communicates with a vertical pipe 43, preferably of smaller diameter than the pipe or duct 42. This pipe 43 extends upward through one of the ducts 3 to a point above the top of the cylinder B and communicates with the interior of the cylinder, preferably through the horizontal pipe 44, which is provided at its inner end with a depending section 45.

41 is an aperture through the distributer approximately circular in form and arranged centrally beneath the bottom wall 2 of the outer cylinder.

The operation of the machine is as follows: Water is supplied to the interior of the cylinder B until it reaches the top flange 13, and the outer cylinder A is also supplied with water to the necessary level either by the overflow from the inner cylinder or from an external source. Heat from any suitable generator, such as a stove or the flame of a gasolene or oil burner 46, is then directed against the bottom wall 2 of the outer cylinder and against the distributer and supplemental heater C. I have illustrated in the drawings more or less conventionally a heater at 46 which can be employed, it being shown as supplied with gas, vapor, or oil through a pipe at 46'. The flames, products of combustion, or heating-currents will pass up through the aperture 41 in the distributer and also around it and then through the ducts or flues 3. As the water becomes heated in the outer cylinder A and in the water-distributer C that which is in the pipe 43 will be caused to be carried over through the pipes 44 and 45 and delivered in and near the bottom of the cylinder B. As this cylinder is already full, the introduction of a further supply will cause some of the water to run over the top of flange 13 into the cylinder A. This circulation of the water will continue until finally the water in both the inner and outer cylinders will be at practically the same temperature. This action of the parts with respect to the distribution of the water is, as I at present understand, due to the presence of the peculiarly constructed and arranged part which I have termed the "distributer" and "supplemental" heater and of the ducts leading thereto and therefrom. As above noted, the water descends from the cylinder A through the duct 42 to the lowest part of the chamber 40 and escapes from the said chamber at its highest point through the duct 43. The heating agent acts directly and powerfully upon this heater and distributer C, and water of a high temperature and relatively high pressure rapidly rises toward the duct 43, and as the latter continues to be highly heated by the products of combustion in the flue 3, in which this duct is situated, the temperature and pressure are increased, with a tendency even of forming steam. The water in the lower part, as at 36, of the heater and distributer C and that which is pressing downward in the duct 42 prevent back pressure or reactionary movement of the water into the vessel A again, and the difference in pressure which results furnishes the force that carries the water through the pipes or ducts 43, 44, and 45, even though that part of the duct at 44 is higher than the water-columns in the vessels B and A. The duct provided by these parts just referred to can be divided and part removed when it is desired to lift the inner vessel B upward for cleaning the apparatus or for other purposes. The parts 44 and 45 of the water-duct can be separated from the part 43. At 47 there is an aperture formed in the part 45 of this duct, this aperture being situated just above the highest liquid-level. It serves to prevent any back suction of water through the circulating-duct. Sometimes when starting the apparatus if there be a body of cold water present there is apt to occur a temporary chilling or checking of the heater C, which in turn more or less condenses the steam or hot water in the pipe 43, and a back suction of water results; but by having a cut-off to the atmosphere, as shown at 47, the water in the inner vessel will not be lifted or taken downward by such suction.

When the desired uniform temperature of the water on both sides of the passage 16 has been attained, the milk or liquid to be sterilized is poured into the funnel 20. It descends through the pipe 19 and enters the passage-way between the cylinders 5 and B, and power is simultaneously applied to the shaft 28 and the inner cylinder B is rotated, the helical winding thereon causing the milk to be elevated in a circuitous path between the cylinders. The milk rising between the cylinders is elevated into the trough 8 and from there is delivered through the pipe 9. After the milk has been sterilized the entire machine may be cooled in any suitable manner, as by placing it in a bucket or tub of water. It is then ready for use as a cooler. Cold water is run into the interior cylinder B by any suitable means and allowed to flow over into and fill the exterior cylinder A, and then the heated milk may be run back through the machine and uniformly and quickly cooled.

While I have above described the details of an apparatus such as I at present prefer to use, it is to be understood that I do not limit the essential features of the invention to all of them, as there can be modifications in many respects without departing from the invention. Good results can be secured if the helical devices at 17 are omitted, although in such case the inner and outer walls bounding the milk-path should be quite close together, as above described. A device for causing the circulation of the water of modified character can be substituted for one of the precise form shown and described. Reference has been made above to the fact that the device shown is more specifically designed for handling of milk or other liquids in small quantities; but I do not know of any necessary limitation in this respect.

I believe myself to be the first to have devised the features of structure and arrangement and the mode of operation which I have described, including the combination with the inner and outer vessels bounding the path of the milk and adapted to hold separate bodies of water and adapted to have heat applied directly to one of them and devices for causing the flow of water from one of them to the other against the action of gravity and through the agency of the heating medium, which is directly applied, as aforesaid, and in carrying out this invention numerous plans can be followed.

What I claim is—

1. In a device for heating liquids, the combination of an inner water-holding vessel, an outer water-holding vessel, said vessels having adjacent walls providing a path for the liquid to be heated, one of said vessels being adapted to have heated currents applied directly thereto to raise the temperature of the water which it contains, and a water-duct communicating with both the inner vessel and the outer vessel and adapted to be heated to a higher temperature than the water in the said vessels, substantially as set forth.

2. In an apparatus for heating liquids, the combination of an inner water-holding vessel, an outer water-holding vessel, the walls of said vessels providing a passage-way for the liquid to be heated, and a water-duct communicating with both of the said vessels and adapted to be heated supplementally to the heating of either of the water vessels and to a temperature higher than the water in either of said vessels, whereby water may be forced from one vessel to the other, substantially as set forth.

3. In a device for heating liquids, the combination of an inner water-holding vessel, an outer water-holding vessel, said vessels having adjacent walls providing a path for the liquid to be heated, and a water-duct communicating with both of said water-holding vessels and having a part thereof below the level of the lowest body of water in said vessels exposed and situated outside both of said water-bodies, and adapted to have heated currents applied directly thereto, substantially as set forth.

4. In an apparatus for heating liquids, the combination of an outer water-holding vessel having an external wall adapted to be impinged upon by currents of heated air or gas and having flues for the passage of said currents, an inner vessel adapted to hold a body of water separate from the body of water in the outer vessel, and a water-duct communicating with both of said vessels and adapted to be heated independently of the said water vessels and extending to points above the level of the water in either of said vessels, substantially as set forth.

5. In an apparatus for heating liquids, the combination of an outer water-holding vessel, an inner vessel adapted to hold a separate body of water with a level higher than that of the water in the outer vessel, the adjacent walls of said vessels forming a path for the liquid to be heated and a water-duct communicating with both of said vessels having a section outside of both vessels and adapted to be heated independently thereof to maintain a continuous circulation of water between the said vessels, said duct extending to points above the level of the water in the inner vessel, substantially as set forth.

6. In an apparatus for heating liquids, the combination of an outer water-holding vessel, an inner water-holding vessel adapted to deliver water from its upper edge to the outer vessel, the adjacent walls of the said vessels forming a path for the liquid to be heated and a water-duct communicating with both of the said vessels and adapted to be externally heated independently thereof and arranged to conduct water from one of the said vessels to the other, substantially as set forth.

7. In an apparatus for heating liquids, the combination of an outer water-holding vessel, an inner vessel adapted to hold a body of water with a level higher than that of the body in the outer vessel and to deliver water thereto by overflow at its upper level, said inner and outer water-holding vessels having adjacent walls forming a pathway for the liquid to be heated, an escape for the liquid communicating with the said pathway, and a water-duct communicating with both of the said water-holding vessels and adapted to be externally heated independently thereof to a temperature higher than the temperature of the bodies of water in said vessels and extending to points above the water-level of the inner vessel, substantially as set forth.

8. In an apparatus for heating liquids, the combination of an outer water-holding vessel, the inner water-holding vessel, said vessels being arranged to have a reduced passageway between their walls, means for rotating the inner vessel, and a water-duct communicating with both of the said water-holding vessels, and adapted to be externally heated independently thereof to a temperature higher than the temperature of the bodies of water in said vessels and extending to points above the level of the water in the vessel from which said duct conducts water to the other vessel, substantially as set forth.

9. In an apparatus for heating liquids, the combination of an inner water-holding vessel, an outer water-holding vessel, the walls of said vessels providing a passage-way for the liquid to be heated and the water in one vessel having normally a level differing from the water in the other vessel, and a water-duct communicating with the said vessels and through which water can pass from the vessel having the lower level to the vessel having water of the higher level, and said water-duct being adapted to be directly heated by heated currents applied to the outer surfaces of said ducts independently of the water vessels for causing such flow of water from the one to the other, substantially as set forth.

10. In a vessel for heating liquids, the combination of an outer vessel adapted to hold a body of the liquid to be treated and to hold a body of water around the said liquid to be treated, an inner vessel adapted to hold a body of water with a level higher than the water-body in the outer vessel and to supply water at such higher level to said outer vessel, a withdrawing-duct for the liquid to be treated communicating with the space between the inner vessel and the outer vessel, a supply-duct for supplying the liquid to be treated to the said space and extending to points higher than the withdrawing-duct, and a water-duct communicating with both the water-chambers in the inner vessel and the outer vessel and having a part thereof below the water in the outer vessel situated outside of both the bodies of water and adapted to be heated to a higher temperature than the bodies of water in said vessels, substantially as set forth.

11. In an apparatus for heating liquids, the combination of the outer vessel having an inner wall and an outer wall forming a water-chamber, heating-flues in the said water-chamber, a bottom wall adapted to be heated by the direct impinging of currents of heated air or gas, an inner water-holding vessel having its wall adjacent to the inner wall of the outer vessel, and a water-duct communicating with both the inner and the outer water-holding vessels and having a part thereof below the bottom of the outer vessel and adapted to be directly heated by means outside of the said water vessels, substantially as set forth.

12. In an apparatus for heating liquids, the combination with the outer water-holding vessel, an inner water-holding vessel adapted to hold a body of water independent of that in the outer vessel, and the supplemental water heater and distributer C situated outside of said water-holding vessels and having the lower receiving portion and the higher water-distributing portion and adapted to be heated directly by heating means independent of the bodies of water in the said vessels, substantially as set forth.

13. The combination of the inner water-holding vessel, the outer water-holding vessel having an outer wall and an inner wall, said inner wall being adjacent to the wall of the inner water-holding vessel and forming therewith a restricted passage-way for the liquid to be heated, the inner water-holding vessel being adapted to hold a body of water at a higher level than that in the outer vessel, and the outer vessel having a wall adapted to be heated directly by currents of air or gas, and a duct extending from the said outer water vessel into the inner vessel and adapted to be heated to a higher degree than the outer vessel by the same currents of air or gas which heat the outer vessel, said duct extending to points higher than the water in the outer vessel, substantially as set forth.

14. In a device for heating liquid, the combination of an inner water-holding vessel, an outer water-holding vessel, said vessels having adjacent walls providing a path for the liquid to be heated, the inner vessel being adapted to hold a body of water at a level higher than the body of water in the outer vessel and to discharge water into the outer vessel, the heater and distributer arranged beneath the outer vessel and communicating therewith, and the duct leading from said heater and distributer to the interior of said inner vessel.

15. In a device for heating liquid, the combination of an inner water-holding vessel, an outer water-holding vessel, said vessels having adjacent walls providing a path for the liquid to be heated, the inner vessel being arranged to discharge water into the outer vessel when its level in the inner vessel exceeds a fixed height, the water heater and distributer having a relatively narrow passage-way for the water therethrough arranged outside of said vessels, the duct communicating with said passage and with said outer water-holding vessel, and the duct communicating with said passage and said inner water-holding vessel.

16. In a device for heating liquid, the combination of an inner water-holding vessel, an outer water-holding vessel, said vessels having adjacent walls providing a path for the liquid to be heated, the inner vessel being arranged to discharge water into the outer vessel when its level in the inner vessel exceeds a fixed height, the water heater and distributer having a relatively narrow passage-way for the water therethrough, adapted to have its outer surfaces directly impinged upon and heated by highly-heated currents adapted to maintain a constant circulation between the outer cylinder and the inner cylinder, the duct communicating said passage-way with said outer water-holding vessel and the duct communicating said passage-way with the inner water-holding vessel.

17. In an apparatus for heating liquids, the combination of an inner water-holding vessel, an outer water-holding vessel, said vessels having adjacent walls providing a path for the liquid to be heated, a heater or distributer C having a relatively thin expanded water-chamber 40 shaped substantially as described and adapted to receive the water to be heated at its lower level and to deliver it from its higher level, a duct connecting said water-chamber with said outer water-holding vessel, and a duct leading from said water-chamber to said inner water-holding vessel.

In testimony whereof I affix my signature in presence of two witnesses.

JOHN C. MILLER.

Witnesses:
C. GEIDLINGER,
HARVEY H. MINERS.